United States Patent Office 3,850,986
Patented Nov. 26, 1974

---

3,850,986
SOLVENT-FREE PROCESS FOR 3-(HALOPHENYL)-1,1-DIALKYL UREAS
James Bernard Platz, Pasadena, Tex., assignor to E. I. du Pont de Nemours and Company, Wilmington, Del.
No Drawing. Filed July 20, 1971, Ser. No. 164,478
Int. Cl. C07c 127/18
U.S. Cl. 260—553 A
12 Claims

ABSTRACT OF THE DISCLOSURE 3-(Halophenyl)-1,1-dialkyl ureas useful as herbicides are prepared in an anhydrous solvent-free process by reaction of the appropriately substituted isocyanate and dialkyl amine by concurrent addition of the reactants while maintaining the temperature of the reactants in excess of the melting point of the urea that is formed.

BACKGROUND OF THE INVENTION 3-(Halophenyl)-1,1-dialkyl ureas are known to be useful for killing or preventing weeds or undesirable plant growth. U.S. Pats. 2,655,444 and 2,655,445 (both dated Oct. 13, 1953 and issued to Todd) teach the use and preparation of these useful substituted ureas. In the methods of these patents the compounds are typically prepared by the reaction of the appropriately substituted phenyl isocyanate with the appropriate dialkyl secondary amine. The patents teach that the amine-isocyanate reaction is most readily carried out in the presence of an inert solvent and that no catalyst is needed in the exothermic reaction. Thus the art teaches that the reaction is conveniently carried out by first mixing the isocyanate with the inert solvent at room temperature and then gradually adding the secondary amine reactant while permitting the temperature to increase. Since the substituted urea products are generally quite insoluble in the solvent used, they precipitate out as formed and are then separated from the reaction mass.

Typically, U.S. Pat. 2,655,445 teaches that in the preparation of 3-(3,4-dichlorophenyl)-1,1-dimethylurea, the 3,4-dichlorophenyl isocyanate is prepared by reacting phosgene with 3,4-dichloroaniline hydrochloride. The resulting mixture is then cooled and dimethylamine is passed into it rapidly at a temperature of about 18–34° C. until present in excess. The mixture is then poured into water and the excess amine neutralized with hydrochloric acid. The desired 3-(3,4-dichlorophenyl)-1,1-dimethylurea precipitates and is removed by filtration. It then must be washed with water and cold ethyl alcohol, then recrystallized from ethyl alcohol. Additional dimethylurea can be obtained by recrystallization of additional crude product recovered by concentration of the mother liquor. In Example 2 of the patent the combined yield from the first precipitate and that obtained from the mother liquor was 61% of the theoretical yield.

From the above it is thus seen that an anhydrous solvent-free process providing a high yield of the 3-(halophenyl)-1,1-dialkyl urea would be highly desirable. The anhydrous solvent-free process of this invention results in yields in excess of 98%.

Even if the prior art processes were able to achieve a yield level of 98% or better, the process of this invention offers a significant advantage since it is not necessary to use the expensive solvent removal equipment required by the prior art solvent processes.

SUMMARY OF THE INVENTION

The invention in its broader aspects is defined as in the process for preparing herbicidal 3-(halophenyl)-1,1-dialkyl substituted ureas of the formula:

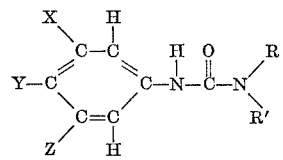

wherein R is an alkyl group of 1–2 carbon atoms, R' is an alkyl group of 1–4 carbon atoms, X and Z are selected from the group consisting of hydrogen and halogen, and Y is selected from the group consisting of hydrogen, halogen, alkyl and alkoxy with the alkyl radical in said alkyl and alkoxy substituents containing up to 4 carbon atoms, with at least one and at most two of X, Y, and Z being halogen, comprising subjecting a mixture of a phenyl isocyanate of the formula:

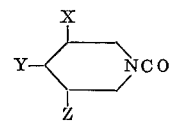

and an amine of the formula:

wherein X, Y, Z, R and R' are as defined above, to reaction conditions to provide the substituted urea; the improvement for carrying out the process under anhydrous solvent-free conditions in high yield, wherein the improvement comprises adding the amine and the isocyanate to the reactor vessel concurrently while agitating with the amine under pressure to provide a stoichiometric excess of amine while maintaining the temperature of the reactants at a temperature in excess of the melting point of the substituted urea that is formed.

It is preferred that the temperature of the reactants be maintained at a level of at least 5° C. above the melting point of the substituted urea that is formed. The amine is always in stoichiometric excess as it is under pressure within the reactor. It is preferred that the amine be under a pressure of about 0.75 kg./cm.$^2$–1.30 kg./cm.$^2$ gauge.

The preferred reactants are the ones wherein R' is an alkyl radical of 1–2 carbon atoms and R is methyl. More preferably R and R' are a methyl, Y and Z are chloro, and X is hydrogen and for these particular reactants the temperature is preferably maintained within the range of about 160°–180° C. Other particularly desirable reactants are those wherein R and R' are methyl, Y is chloro, and X and Z are hydrogen. With these reactants the temperature of the reactants within the reactor is maintained within the range of about 185°–210° C.

The reactants wherein R is methyl, R' is n-butyl and Y and Z are chloro is also desirable with this process. With these reactants the temperature of the reactants is maintained within the range of about 110–130° C.

DETAILED DESCRIPTION OF THE INVENTION

The appropriately substituted phenylisocyanate and the dialkylamine are subjected to reaction conditions within the reactor to provide the desired 3-halophenyl-1,1-dialkylurea.

In the anhydrous solvent-free process of this invention a reactor having agitation means is used and the amine gas is always maintained under pressure to provide a stoichiometric excess of amine. The isocyanate is added concurrently while maintaining the temperature of the reactants within the required range.

In order to achieve good vapor-liquid contact in the reactor it is essential to have good agitation. This can be done with an appropriate stirrer or with sparging. The reaction is rapid and is exothermic. Therefore the reactor must have either a cooling jacket or appropriate cooling coils for maintaining the temperature at the desired level that is in excess of the melting point of the final product.

It is desirable to start the reactor with about 30% of its capacity filled with the desired product. In a batch operation this is most conveniently done by only discharging about two-thirds of the previous run. This remaining heel leads to better vapor-liquid contact while the isocyanate and amine are being concurrently added to the reactor vessel.

Since the reaction is exothermic, the rate of addition of the reactants must be at a level to assure that the cooling capacity of the reactor is sufficient to maintain the temperature within the level desired.

For a continuous operation the final product is continuously withdrawn from the reactor.

The details of the invention are more specifically exemplified in the examples that follow.

All pressures are gauge unless otherwise specified.

EXAMPLE 1

3-(3,4-Dichlorophenyl)-1,1-dimethylurea

A stirred, closed reactor set up for a batch operation is utilized. The reactor has coils for removing the heat of reaction in order to maintain the temperature of the reactants at the desired level.

The reactor is purged with nitrogen gas and then dimethylamine gas introduced under pressure. The pressure of the amine gas is maintained at a pressure of about 1.1 to 1.25 kg./cm.$^2$ gauge. 3,4-Dichlorophenyl isocyanate is added to the reactor vessel over a period of about three hours and thirty minutes. During this period the temperature of the reactants is maintained within the range of 173–180° C. by removal of the heat of reaction with the coils within the reactor. During this time 3.40 kilograms of dimethylamine is consumed and 12.10 kilograms of the isocyanate is consumed. A total of 15.0 kilograms of the dialkylurea is produced.

The yield is calculated to be 98.7% and the production rate of the dimethylurea is 12.3 kgs./hr.

The product is of good quality and the percent of free amines is 0.025%. The total dimethylurea content is 98.9%.

EXAMPLE 2

3-(3,4-Dichlorophenyl)-1,1-dimethylurea

A closed stirred reactor set up for a batch operation is utilized. The reactor has cooling coils for removing the heat of reaction in order to maintain the temperature of the reactants at the desired level.

The pressure within the reactor is maintained with dimethylamine gas at a level ranging from about 0.95–1.30 kg./cm.$^2$ gauge.

3,4-Dichlorophenyl isocyanate is added to the reactor slowly while maintaining the dimethylamine pressure. The isocyanate is added to the reactor over a period of about three hours and fifteen minutes while vigorously agitating the reactants and while maintaining the temperature within the range of about 165–193° C.

The total isocyanate added is 25.5 kgs. while 6.4 kgs. of dimethylamine is added. 31.4 kgs. of the dimethylurea is obtained resulting in a yield of 99.3%.

The product is of good quality as the free amine content is 0.02%. The total dimethylurea in the product is 98.38%.

EXAMPLE 3

3-(p-Chlorophenyl)-1,1-dimethylurea

The general procedure of Example 1 is followed except that the isocyanate is p-chlorophenyl isocyanate and the temperature of the reactants is maintained at a level within the range of about 185–210° C.

Results similar to those obtained in Example 1 are achieved.

The procedure is repeated except that the reactor initially has about 30% of its capacity filled with the product desired. Such a procedure achieves better liquid-vapor contact as a result of the agitation during the addition of the reactants.

Similar results are likewise obtained as in Example 1.

EXAMPLE 4

1-n-Butyl-3-(3,4-dichlorophenyl)-1-methylurea

The general procedure of Example 2 is followed except that the amine is n-butyl methylamine instead of the dimethylamine. The temperature of the reactants is maintained within the range of about 110–130° C.

Results similar to those obtained in Example 2 are likewise achieved.

In the following examples the general procedure of Example 1 is followed except that the isocyanate and the amine is as indicated in the Table. The temperature of the reactants is maintained at a level of at least 5° above the melting point of the final 3-halophenyl-1,1-dialkylurea product. In all the examples the results are similar to those achieved in Example 1.

TABLE

| Ex. No. | Isocyanate | Amine | Product |
|---|---|---|---|
| 5 | 3,4-dichlorophenyl isocyanate | Diethyl amine | 3-(3,4-dichlorophenyl)-1,1-diethylurea. |
| 6 | do | Isopropylmethyl amine | 3-(3,4-dichlorophenyl)-1-methyl-1-isopropylurea. |
| 7 | do | n-Butylmethyl amine | 3-(3,4-dichlorophenyl)-1-methyl-1-n-butylurea. |
| 8 | do | sec. Butylmethyl amine | 3-(3,4-dichlorophenyl)-1-methyl-1-sec. butylurea. |
| 9 | p-Chlorophenyl isocyanate | Dimethyl amine | 3-(p-chlorophenyl)-1,1-dimethylurea. |
| 10 | m-Chlorophenyl | do | 3-(m-chlorophenyl)-1,1-dimethylurea. |

I claim:

1. In the process for preparing herbicidal 3-(halophenyl)-1,1-dialkyl substituted ureas of the formula:

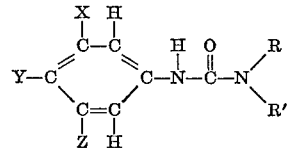

wherein R is an alkyl group of 1–2 carbon atoms, R' is an alkyl group of 1–4 carbon atoms, X and Z are selected from the group consisting of hydrogen and halogen, and Y is selected from the group consisting of hydrogen, halogen, alkyl and alkoxy with the alkyl radical in said alkyl and alkoxy substituents containing up to 4 carbon atoms, with at least one and at most two of X, Y, and Z being halogen, comprising subjecting a mixture of a phenyl isocyanate of the formula:

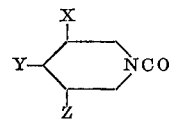

and an amine of the formula:

wherein X, Y, Z, R and R' are as defined above, to reaction conditions to provide the substituted urea; the improvement for carrying out the process under anhydrous solvent-free conditions in high yield, wherein the improvement comprises adding the amine and the isocyanate to the reactor vessel concurrently while agitating with the amine which is in a gaseous state under pressure to provide a stoichiometric excess of amine while maintaining the temperature of the reactants at a temperature in excess of the melting point of the substituted urea that is formed.

2. The process of Claim 1 wherein the temperature is at least 5° C. above the melting point of the substituted urea that is formed.

3. The process of Claim 1 wherein the process is a batch process.

4. The process of Claim 1 wherein the pressure within the reactor is maintained within the range of 0.75 kg./cm.$^2$–1.30 kg./cm.$^2$ gauge.

5. The process of Claim 1 wherein R' is an alkyl radical of 1–2 carbon atoms and R is methyl.

6. The process of Claim 1 wherein R and R' are methyl, Y and Z are chloro, and X is hydrogen.

7. The process of Claim 6 wherein the temperature is maintained within the range of about 160–180° C.

8. The process of Claim 1 wherein R and R' are methyl, Y is chloro, and X and Z are hydrogen.

9. The process of Claim 8 wherein the temperature is maintained within the range of about 185–210° C.

10. The process of Claim 1 wherein Y and Z are chloro.

11. The process of Claim 1 wherein R is methyl, R' is n-butyl, and Y and Z are chloro.

12. The process of Claim 11 wherein the temperature is maintained within the range of about 110–130° C.

References Cited
UNITED STATES PATENTS 2,655,447   10/1953   Todd _____ 260—553 A X

FOREIGN PATENTS 193,492   3/1967   U.S.S.R. _____ 260—553 A

LEON ZITVER, Primary Examiner

M. W. GLYNN, Assistant Examiner